(12) United States Patent
Wagle et al.

(10) Patent No.: US 12,122,958 B2
(45) Date of Patent: Oct. 22, 2024

(54) LOSS CIRCULATION MATERIAL

(71) Applicant: Saudi Arabian Oil Company, Dhahran (SA)

(72) Inventors: Vikrant Wagle, Dhahran (SA); Noktan Mohammed AlYami, Dammam (SA); Abdullah Saleh Hussain Al-Yami, Dhahran (SA); Khawlah Alanqari, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/114,759

(22) Filed: Feb. 27, 2023

(65) Prior Publication Data

US 2024/0294820 A1 Sep. 5, 2024

(51) Int. Cl.
| | |
|---|---|
| C09K 8/518 | (2006.01) |
| C08G 59/24 | (2006.01) |
| C08G 59/50 | (2006.01) |
| C08J 9/08 | (2006.01) |
| C09K 8/508 | (2006.01) |
| E21B 21/00 | (2006.01) |

(52) U.S. Cl.
CPC ............ *C09K 8/518* (2013.01); *C08G 59/245* (2013.01); *C08G 59/5006* (2013.01); *C08J 9/08* (2013.01); *C09K 8/5086* (2013.01); *E21B 21/003* (2013.01); *C08J 2203/02* (2013.01); *C08J 2363/02* (2013.01)

(58) Field of Classification Search
None
See application file for complete search history.

(56) References Cited

U.S. PATENT DOCUMENTS

| | | | |
|---|---|---|---|
| 4,072,194 | A | 2/1978 | Cole et al. |
| 5,875,845 | A | 3/1999 | Chatterji et al. |
| 6,802,375 | B2 | 10/2004 | Bosma et al. |
| 8,235,116 | B1 | 8/2012 | Burts, Jr. et al. |
| 9,550,933 | B2 | 1/2017 | Chatterji et al. |
| 9,784,079 | B2 | 10/2017 | Salla et al. |
| 10,280,122 | B2 | 5/2019 | Salla et al. |

(Continued)

OTHER PUBLICATIONS

Unruh et al.; "Thermally Activated, Single Component Epoxy Systems"; Macromolecules; 2011, 44, p. 6318-6325. (Year: 2011).*

(Continued)

*Primary Examiner* — Andrew Sue-Ako
(74) *Attorney, Agent, or Firm* — Fish & Richardson P.C.

(57) ABSTRACT

A method for mitigating loss circulation zones in a wellbore is provided. The method includes synthesizing a carbamate from an amine-curing agent, and the carbamate is mixed with an epoxy resin from the loss control composition. The loss control composition is pumped into a wellbore with a loss circulation zone, wherein the loss control composition flows into the loss circulation zone. The carbamate of the loss control composition is allowed to decompose at wellbore temperatures, wherein the carbamate releases $CO_2$ gas and the amine-curing agent. The $CO_2$ gas foams the epoxy resin, expanding the epoxy resin to fill voids in the loss circulation zone, and the amine-curing agent cures the foamed epoxy resin, forming a loss control material that seals the loss circulation zone.

14 Claims, 5 Drawing Sheets

(56) References Cited

U.S. PATENT DOCUMENTS

| | | |
|---|---|---|
| 10,287,480 B1 | 5/2019 | Reddy |
| 10,344,200 B2 | 7/2019 | Salla et al. |
| 10,450,495 B2 | 10/2019 | Reddy |
| 10,526,524 B2 | 1/2020 | Reddy |
| 11,370,956 B2 | 6/2022 | Alanqari et al. |
| 2010/0326660 A1 | 12/2010 | Ballard et al. |
| 2014/0190697 A1* | 7/2014 | Tang .................. C09K 8/68 |
| | | 166/295 |
| 2020/0181477 A1* | 6/2020 | Khamatnurova ........ C09K 8/62 |
| 2022/0056233 A1 | 2/2022 | Wagle et al. |

OTHER PUBLICATIONS

Ren et al., "One-Pack Epoxy Foaming with CO2 as Latent Blowing Agent," ACS Macro Letters, Jun. 2015, 5 pages.

* cited by examiner

LOSS CIRCULATION MATERIAL

TECHNICAL FIELD

This disclosure relates to a one pack foaming loss circulation material comprising an epoxy resin and a carbamate.

BACKGROUND

Fluids used in drilling, completion, or servicing of a wellbore, such as drilling fluid, can be lost to a subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. The extent of fluid losses to the formation may range from minor, for example, less than 10 bbl/hr, to severe, for example, greater than 100 bbl/hr, or higher. As a result, the service provided by such fluid, such as carrying rock cuttings out of the wellbore, is more difficult or costly to achieve.

One of the main reasons why loss circulation is difficult to remedy is the lack of knowledge about accurate fracture width and depth encountered while drilling, leading to an improper selection of suitable plugging materials that can adapt, in both volume and shape, to effectively plug a wide range of fractures with unknown dimensions. Generally, non-reactive particulate or fiber based fluids or settable fluid, are used to seal loss circulation zones. However, these types of loss circulation materials, when applied in insufficient quantities, cannot effectively seal a high permeability zone.

SUMMARY

An embodiment described herein provides a method for mitigating loss circulation zones in a wellbore. The method includes synthesizing a carbamate from an amine-curing agent, and the carbamate is mixed with an epoxy resin from the loss control composition. The loss control composition is pumped into a wellbore with a loss circulation zone, wherein the loss control composition flows into the loss circulation zone. The carbamate of the loss control composition is allowed to decompose at wellbore temperatures, wherein the carbamate releases $CO_2$ gas and the amine-curing agent. The $CO_2$ gas foams the epoxy resin, expanding the epoxy resin to fill voids in the loss circulation zone, and the amine-curing agent cures the foamed epoxy resin, forming a loss control material that seals the loss circulation zone.

DETAILED DESCRIPTION

Embodiments described herein provide a loss circulation composition, and methods for using the composition in downhole conditions to fill loss circulations zones, such as vugs, voids, and permeable zones, among others. The loss circulation composition (LCC) includes an epoxy resin and a carbamate formed by reacting an amine-curing agent (ACA) with carbon dioxide.

The carbamate decomposes at elevated temperatures in the downhole environment, releasing the $CO_2$ and the ACA. The ACA initiates the curing reaction to form an epoxy resin, and the epoxy resin is foamed using the $CO_2$ as the blowing agent.

In this method to control loss circulation, a composition that includes a mixture of epoxy resin and a carbamate is made at the surface. At ambient temperature, such as less than about 60° C., less than about 50° C., less than about 40° C., less than about 30° C., or lower, the composition is stable. At lower temperatures, the viscosity of the epoxy resin may be problematic. Thus, the composition can be used at temperatures greater than about 10° C., greater than about 15° C., or greater than about 20° C., or higher.

The composition is pumped downhole in a wellbore that has a loss circulation zone. The composition flows into the loss circulation zone. At elevated downhole temperatures, a foamed solid is formed that functions as the LCC. The gelling time of the resin can be controlled by varying the concentration of the carbamate, the amine used to form the carbamate, or both. As the LCC disclosed herein is an expandable foam, the LCC fills volume to effectively seal a wide range of fractures with unknown dimensions.

Figure 1A:
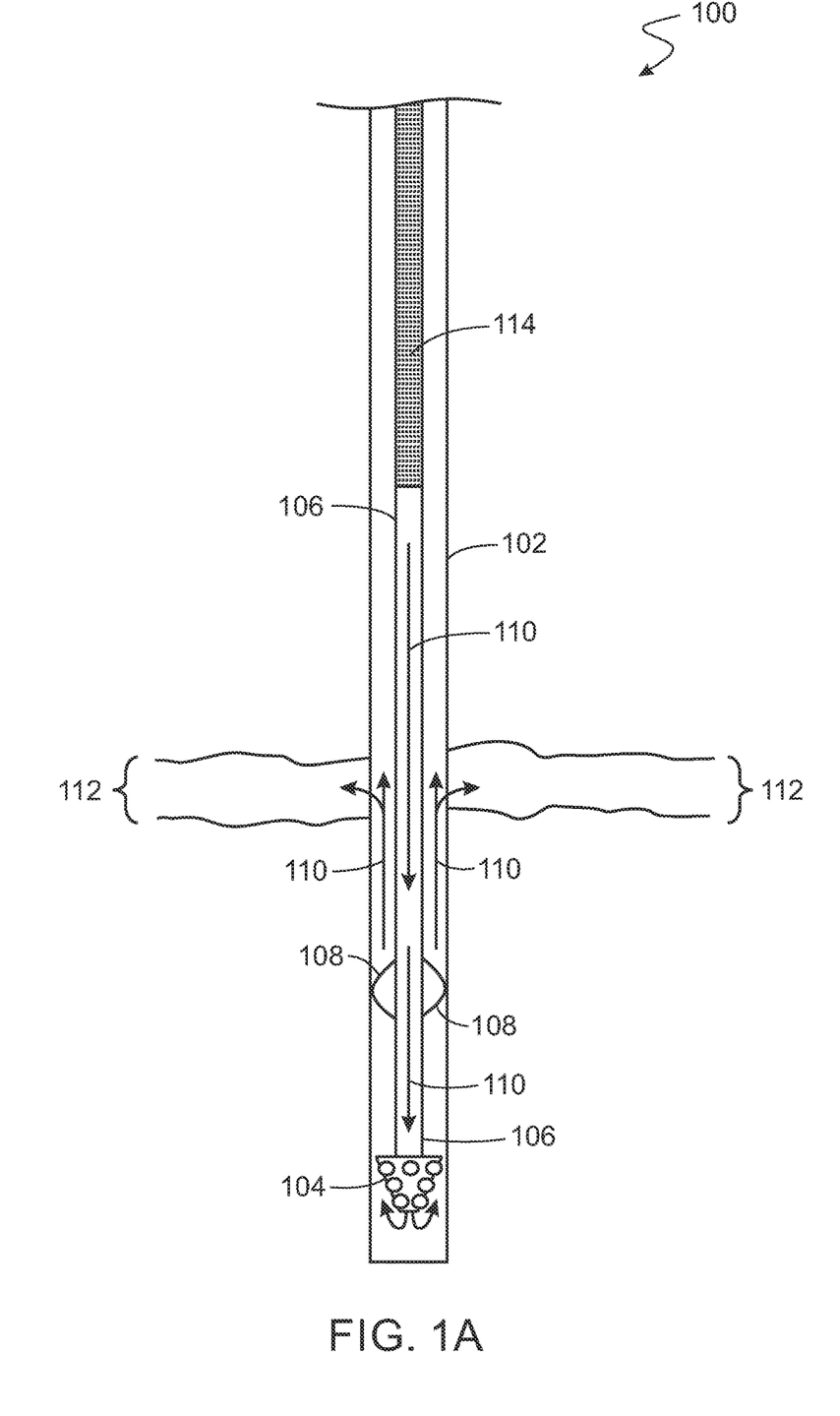
FIGS. 1A, 1B, and 1C are schematic drawings of a process 100 for mitigating loss circulation in a wellbore 102.
Figure 1B:
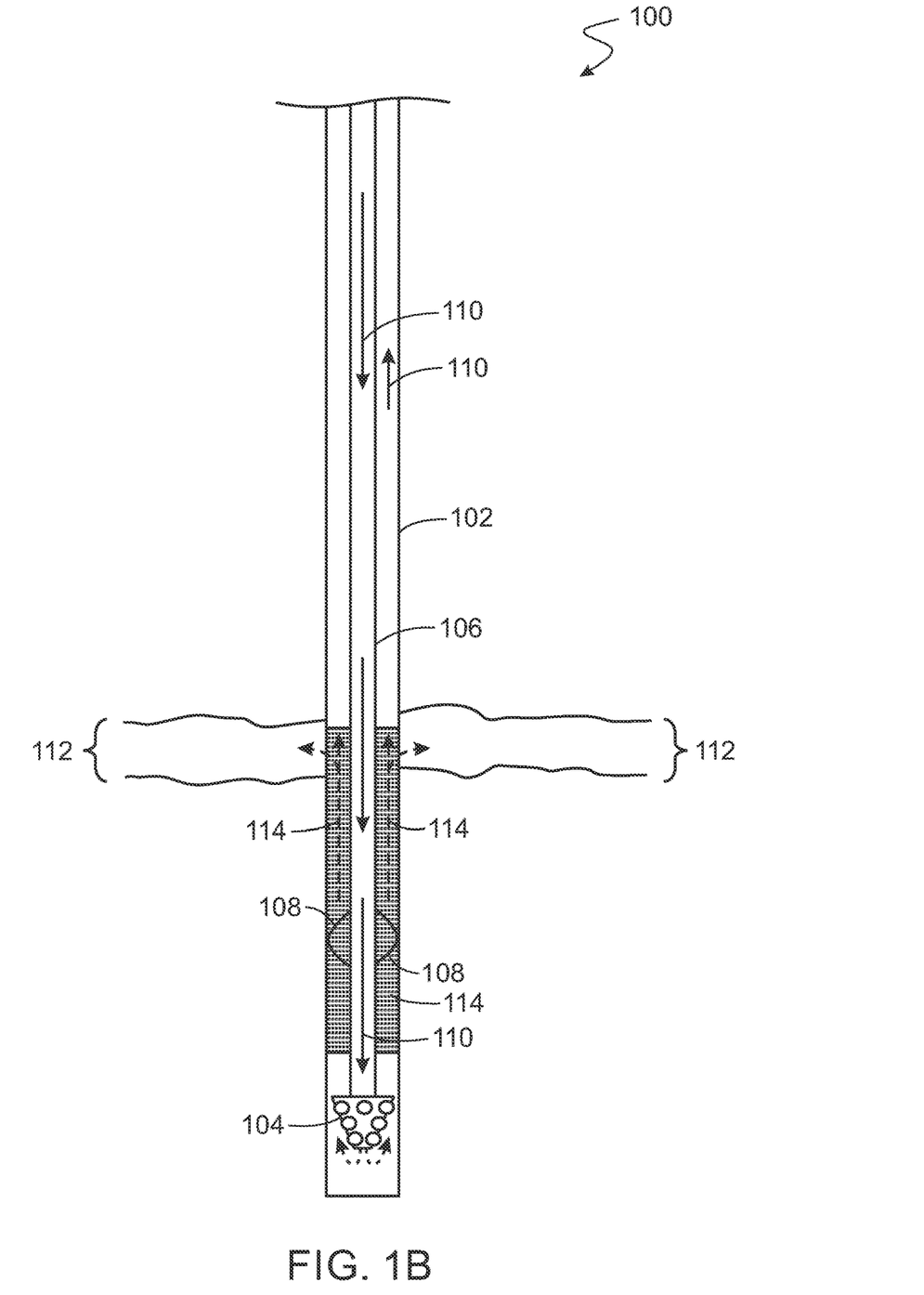
Figure 1C:
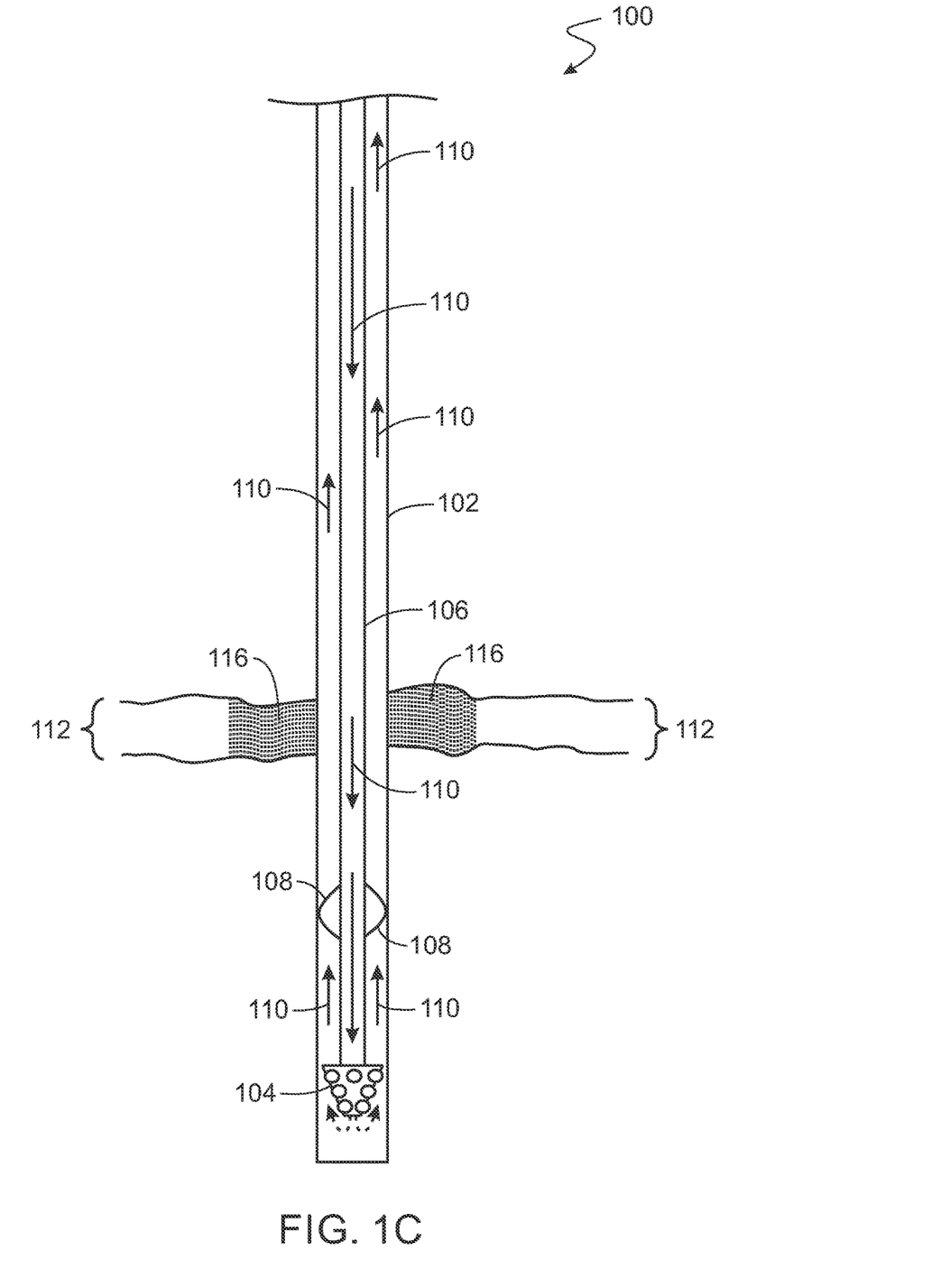

FIGS. 1A, 1B, and 1C are schematic drawings of a process 100 for mitigating loss circulation in a wellbore 102. As shown in FIG. 1A, a drill bit 104 on a drill string 106 is drilling the wellbore 102. This is a simplified drawing as other units may be present. Further, the mitigation of loss circulation is not limited to the drilling process, but may be used at any time where loss circulation occurs. For example, during a well work over, hydraulic fracturing, or other well treatments.

In the example shown in FIG. 1A, the drill string 106 may have centralizers 108 attached to the drill string 106 in the wellbore 102, which keep the drill bit 104 centered in the wellbore 102. Drilling mud 110 is circulated downhole through the drill string 106, and flows out through the drill bit 104. The drilling mud 110 then generally returns to the surface through the wellbore 102, carrying rock cuttings from the drill bit 104. The proportions of the drill string 106 and the wellbore 102 are not necessarily shown to scale to make it easier to see the process 100.

In this example, the drill bit 104 has penetrated a loss circulation zone 112, such as a vug, a void, a fracture, or a permeable layer, among others. At least a portion of the drilling mud 110 flows into the loss circulation zone 112 and fails to return to the surface. The presence of the loss circulation zone 112 is detected by a decrease in the amount of drilling mud 110 returned to the surface in comparison to the amount pumped into the drill string 106. To mitigate the loss of the drilling mud 110 into the loss circulation zone 112, the LCC 114 is injected into the drill string 106 to plug the loss circulation zone 112. As described herein, the LCC 114 includes the mixture of epoxy resin and carbamate.

As shown in FIG. 1B, the LCC 114 flows through the drill string 106, out through the drill bit 104, and back up the wellbore 102 through the annulus outside of the drill string 106. Upon reaching the loss circulation zone 112, the LCC 114 flows into the loss circulation zone 112. The injection of the LCC 114 may be padded by some amount of the drilling mud 110 to push the LCC 114 into the loss circulation zone 112. The heat in the loss circulation zone 112 will then decompose the carbamate in the LCC 114, initiating the curing of the epoxy resin and creating $CO_2$, which functions as the foaming agent.

As shown in FIG. 1C, the LCC 114 forms a loss control material (LCM) 116 in the loss circulation zone 112. During the curing process, the LCM 116 expands from the $CO_2$ formed to fill at least a portion of the loss circulation zone 112. This blocks the loss circulation zone 112, restoring the flow of the drilling mud 110 up the wellbore 102 to the surface.

Figure 2:
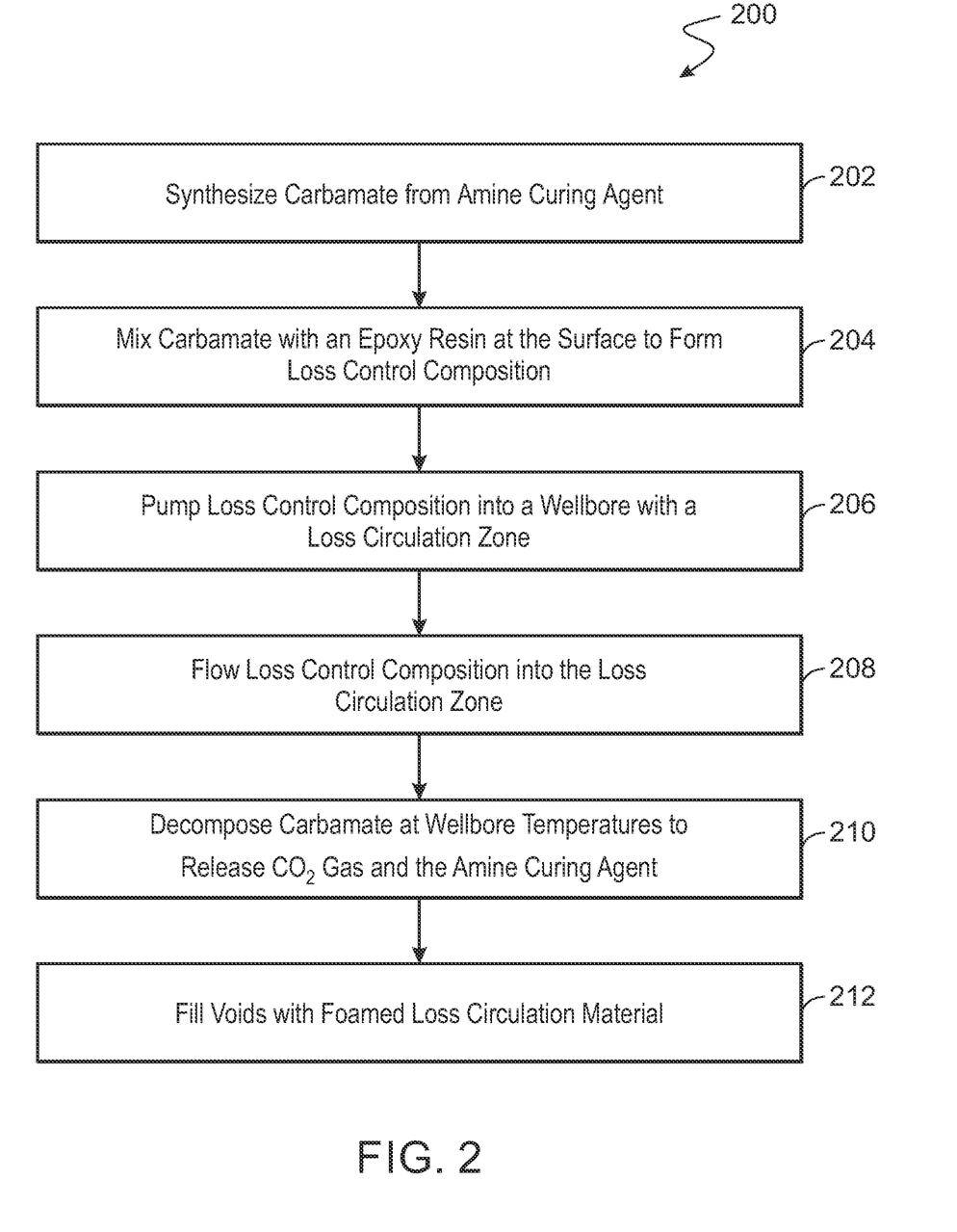
FIG. 2 is a flowchart describing a method 200 to use the composition of epoxy resin and carbamates as a loss circulation material.

FIG. 2 is a flowchart describing a method 200 to use the composition of epoxy resin and carbamates as a loss circulation material. The method 200 begins at block 202 with the synthesis of a carbamate from an amine-curing agent. In some embodiments, the curing agent is a commercial curing agent. Carbamates can be prepared by bubbling $CO_2$ gas at a fixed rate through an amine compound to form ammonium carbamate. Referring also to the reaction shown in FIG. 3, the amine groups react with the $CO_2$ to form ammonium carbamate as a blocked amine compound.

Different amines can be used to prepare the carbamates. Amines that can be used in various embodiments, include an aromatic amine, an aliphatic amine, a cyclo-aliphatic amine, polyamines, amides, polyamides, a polyethyleneimine, piperidine, triethylamine, benzyldimethylamine, N,N-dimethylaminopyridine, 2-(N,N-dimethylaminomethyl)phenol, tris(dimethylaminomethyl)phenol, N-2-(aminoethyl)-3-aminopropyltrimethoxysilane, 3-glycidoxypropyltrimethoxysilane, n-beta-(aminoethyl)-gamma-aminopropyl trimethoxysilane, n-beta-(aminoethyl)-gamma-aminopropyl trimethoxysilane, piperazine, derivatives of piperazine (e.g., aminoethylpiperazine), pyrrole, imidazole, pyrazole, pyridine, pyrazine, pyrimidine, pyridazine, indolizine, isoindole, indole, indazole, purine, quinolizine, quinoline, isoquinoline, phthalazine, naphthyridine, quinoxaline, quinazoline, carbazole, carbazole, phenanthridine, acridine, phenanthroline, phenazine, imidazolidine, phenoxazine, cinnoline, pyrrolidine, pyrroline, imidazoline, piperidine, indoline, isoindoline, quinuclidine, morpholine, azocine, azepine, 1,3,5-triazine, thiazole, pteridine, dihydroquinoline, hexamethyleneimine, indazole, 2-ethyl-4-methyl imidazole and combinations thereof.

Bifunctional or polyfunctional amines are generally used for the curing reaction, to form the thermoset material. The amine selected can be based on the decomposition temperatures and final properties desired for the foam. For example, an amine with large numbers of amine groups, such as 10, 20, or higher, will result in an increasingly hard resin, as the number of cross-links will be increased. Amines with lower numbers of amine groups, such as 5, 3, or 2, will result in lower hardness for the final product, as the number of cross-links will be lower. The amine used may be selected based on the well parameters, such as pressure, temperature, or rock type, among others. For example, a harder resin may be desirable at high pressure and high temperature to prevent collapse of the foam.

At block 204, an epoxy resin and the carbamate are mixed at the surface under ambient conditions, forming the loss control composition. Different amines can be used to prepare these carbamates. As described herein, the carbamate combines dual functionalities of latent curing agent and blowing agent for epoxy resin. Since the carbamate does not trigger curing and foaming below its decomposition temperature, a one-pack epoxy formulation can be designed. If the curing temperature of the amine compound is lower than the decomposition temperature of its blocked counterpart, upon heating to above the decomposition temperature, the carbamate releases $CO_2$ and returns to its amine form as curing agent to produce epoxy foam materials.

The epoxy resin is mixed with the carbamate in the required quantities at the surface. The amount of carbamate to be mixed with the resin would depend on the depth of the loss circulation zone and the temperature. The concentration of carbamate controls the thickening time of the resin, e.g., the time required by the resin to start to gel. The higher the concentration of carbamate in the composition, the lower the thickening time for the resin. In various embodiments, the concentration is between about 0.5 wt. % and about 30 wt. %, or between about 0.5 wt. % and about 10 wt. %, or between about 0.5 wt. % and about 5 wt. %. The concentration of the carbamate can be adjusted to get a thickening time ranging from 0.5 hours to 24 hours.

Different types of epoxy resin such as bisphenol A diglycidyl ether resin, butoxymethyl butyl glycidyl ether resin, bisphenol A-epichlorohydrin resin, and bisphenol F resin can be used. In some embodiments, the epoxy resin is bisphenol A diglycidyl ether resin. As for the carbamate, the selection of the epoxy resin may be based on the well parameters. For example, an epoxy resin with increased hardness may be selected for high pressure and high temperature environments to protect the foam from collapsing.

In some embodiments, a surfactant is included with in the loss circulation composition to aid the formation and stability of the foam generated by the release of the $CO_2$ gas. The surfactant that can be used in the composition can be a cationic surfactant, an anionic surfactant, or a zwitterionic surfactant. The composition can contain a single surfactant or a combination of two or more surfactants. Any type of surfactant can be used in the compositions of the present disclosure, including, for example, cationic surfactants, anionic surfactants, amphoteric (zwitterionic) surfactants, nonionic surfactants, and mixtures thereof. In some embodiments, the surfactant is an amphoteric surfactant.

Examples of suitable surfactants that can be used in the loss circulation composition of are alkyl polyglycol ethers, alkylaryl polyglycol ethers, ethylene oxide/propylene oxide (EO/PO) block copolymers, fatty acid polyglycol esters, polyglycol ethers of hydroxyl-containing triglycerides (for example, castor oil), alkylpolyglycosides, fatty esters of glycerol, sorbitol, or pentaerythritol, amine oxides (for example, dodecyldimethylamine oxide), alkyl sulfates, alkyl ether sulfates, sulfonates, for example, alkyl sulfonates and alkylaryl sulfonates, alkali metal salts or ammonium salts of a carboxylic acid or poly(alkylene glycol) ether carboxylic acid, partial phosphoric esters or the corresponding alkali metal salt or ammonium salt, for example, an alkyl and alkaryl phosphate, an alkylether phosphate, or an alkarylether phosphate, salts of primary, secondary, or tertiary fatty amines, quaternary alkyl- and alkylbenzylammonium salts, alkylpyridinium salts, alkylimidazolinium salts, alkyloxazolinium salts, sultaines (for example, cocamidopropyl hydroxysultaine), betaines (for example, cocamidopropyl betaine), phosphates (for example, lecithin), and combinations thereof.

Examples of anionic surfactants that can be used in the loss circulation composition include an alkyl sulfate, an alkyl ether sulfate, an alkyl ester sulfonate, an alpha olefin sulfonate, a linear alkyl benzene sulfonate, a branched alkyl benzene sulfonate, a linear dodecylbenzene sulfonate, a branched dodecylbenzene sulfonate, an alkyl benzene sulfonic acid, a dodecylbenzene sulfonic acid, a sulfosuccinate, a sulfated alcohol, an ethoxylated sulfated alcohol, an alcohol sulfonate, an ethoxylated and propoxylated alcohol sulfonate, an alcohol ether sulfate, an ethoxylated alcohol ether sulfate, a propoxylated alcohol sulfonate, a sulfated nonyl phenol, an ethoxylated and propoxylated sulfated nonyl phenol, a sulfated octyl phenol, an ethoxylated and propoxylated sulfated octyl phenol, a sulfated dodecyl phenol, and an ethoxylated and propoxylated sulfated dodecyl phenol. Other anionic surfactants include ammonium lauryl sulfate, sodium lauryl sulfate (sodium dodecyl sulfate, SLS, or SDS), and related alkyl-ether sulfates sodium laureth sulfate (sodium lauryl ether sulfate or SLES), sodium myreth sulfate, docusate (dioctyl sodium sulfosuccinate), perfluorooctanesulfonate (PFOS), perfluorobutanesulfonate, alkyl-aryl ether phosphates, and alkyl ether phosphates.

Examples of cationic surfactants that can be used in the loss circulation composition are octenidine dihydrochloride, cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB).

Examples of amphoteric (zwitterionic) surfactants that can be used in the loss circulation composition are 3-[(3-cholamidopropyl)dimethylammonio]-1-propanesulfonate (CHAPS), cocamidopropyl hydroxysultaine, ocamidopropyl betaine, phospholipids, and sphingomyelins.

Examples of nonionic surfactants that can be used in the loss circulation composition are long chain alcohols that exhibit surfactant properties, such as cetyl alcohol, stearyl alcohol, cetostearyl alcohol, oleyl alcohol, and other fatty alcohols. Other long chain alcohols with surfactant properties include polyethylene glycol alkyl ethers, such as octaethylene glycol monododecyl ether and pentaethylene glycol monododecyl ether; polypropylene glycol alkyl ethers; glucoside alkyl ethers, such as decyl glucoside, lauryl glucoside, and octyl glucoside; polyethylene glycol octylphenyl ethers, such as Triton X-100; polyethylene glycol alkylphenyl ethers, such as nonoxynol-9; glycerol alkyl esters, such as glyceryl laurate; polyoxyethylene glycol sorbitan alkyl esters, such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA). In an embodiment, cocamidopropyl hydroxysultaine is used as the surfactant.

At block 206, the composition is pumped downhole through the drill string, through the drill bit, and flows upwards in the wellbore. The composition of the resin and carbamate can be pumped downhole through the bit at any suitable rate. To increase the rate of the pumping, a solvent may be included in the composition to lower the viscosity. In some embodiments, a lower viscosity epoxy resin may be used in the composition. Since the carbamate does not decompose at the surface, the risk of the resin hardening at the surface is eliminated. At block 208, the composition enters the loss circulation zone and encounters high temperature and pressure.

At block 210, the carbamate is allowed to decompose, releasing carbon dioxide and initiating a curing reaction in the epoxy resin. The $CO_2$ gas released during the decomposition of the carbamate foams the epoxy resin during the curing, resulting in a hardened epoxy that functions as the loss control material. At block 212, the foamed epoxy resin expands during curing forming the final loss control material. The resulting LCM plugs the loss circulation zone.

As described herein, the carbamate does not trigger curing due to the absence of free amine groups and foaming below its decomposition temperature. Thus, the carbamate and the epoxy resin can be mixed at the surface without the risk of reaction of carbamate and resin. This property of the carbamate allows design of the one-pack epoxy formulation described herein. Upon heating to above the decomposition temperature, for example, in the loss circulation zone, the carbamate releases $CO_2$ and returns to its amine form as curing agent to produce the epoxy foam-based loss circulation material.

Figure 3:
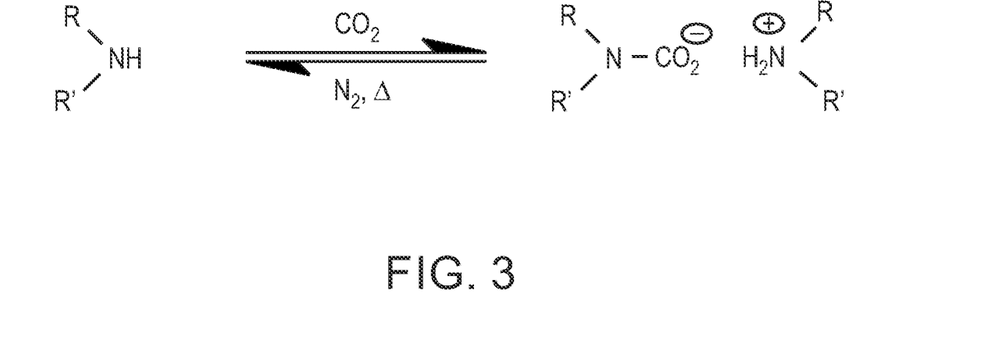
FIG. 3 is a formula detailing the synthesis of carbamate by reacting carbon dioxide gas with an amine-curing agent.

FIG. 3 is a formula detailing the synthesis of carbamate by reacting carbon dioxide gas with an amine-curing agent. In FIG. 3, R and R' are each independently selected from hydrogen, aliphatic groups, or aryl groups, or any combination thereof. In an embodiment, synthesizing the carbamate includes reacting the amine-curing agent with carbon dioxide.

Figure 4:
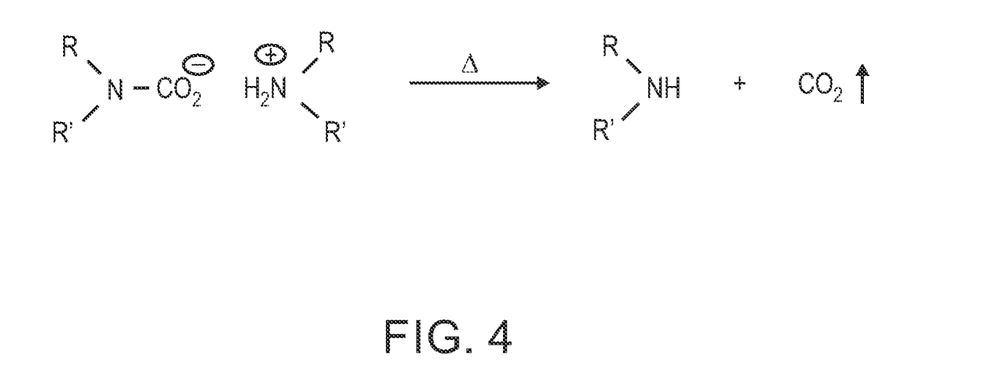
FIG. 4 is a formula detailing the decomposition of the carbamate to release carbon dioxide gas and the amine-curing agent.

FIG. 4 is a formula detailing the decomposition of the carbamate to release carbon dioxide gas and the amine-curing agent. In FIG. 4, R and R' are each independently selected from hydrogen, aliphatic groups, or aryl groups, or any combination thereof.

Embodiments

An embodiment described herein provides a method for mitigating loss circulation zones in a wellbore. The method includes synthesizing a carbamate from an amine-curing agent, and the carbamate is mixed with an epoxy resin from the loss control composition. Chapter loss control composition is pumped into a wellbore with a loss circulation zone, wherein the loss control composition flows into the loss circulation zone. The carbamate of the loss control composition is allowed to decompose at wellbore temperatures, wherein the carbamate releases $CO_2$ gas and the amine-curing agent. The $CO_2$ gas foams the epoxy resin, expanding the epoxy resin to fill voids in the loss circulation zone, and the amine-curing agent cures the foamed epoxy resin, forming a loss control material that seals the loss circulation zone.

In an embodiment, synthesizing the carbamate includes reacting the amine-curing agent with carbon dioxide. In an embodiment, synthesizing the carbamate includes a reaction of the formula:

wherein R and R' are each independently selected from hydrogen, aliphatic groups, or aryl groups, or any combination thereof.

In an embodiment, the amine curing agent includes an amine, an aromatic amine, an aliphatic amine, a cycloaliphatic amine, polyamines, amides, polyamides, a polyethyleneimine, piperidine, triethylamine, benzyldimethylamine, N,N-dimethylaminopyridine, 2-(N,N-dimethylaminomethyl)phenol, tris(dimethylaminomethyl)phenol, N-2-(aminoethyl)-3-aminopropyltrimethoxysilane, 3-glycidoxypropyltrimethoxysilane, n-beta-(aminoethyl)-gamma-aminopropyl trimethoxysilane, n-beta-(aminoethyl)-gamma-aminopropyl trimethoxysilane, piperazine, derivatives of piperazine (e.g., aminoethylpiperazine), pyrrole, imidazole, pyrazole, pyridine, pyrazine, pyrimidine, pyridazine, indolizine, isoindole, indole, indazole, purine, quinolizine, quinoline, isoquinoline, phthalazine, naphthyridine, quinoxaline, quinazoline, carbazole, carbazole, phenanthridine, acridine, phenanthroline, phenazine, imidazolidine, phenoxazine, cinnoline, pyrrolidine, pyrroline, imidazoline, piperidine, indoline, isoindoline, quinuclidine, morpholine, azocine, azepine, 1,3,5-triazine, thiazole, pteridine, dihydroquinoline, hexamethyleneimine, indazole, or 2-ethyl-4-methyl imidazole, or any combination thereof. In an embodiment, the amine-curing agent includes a polyethyleneimine.

In an embodiment, the epoxy resin includes bisphenol A diglycidyl ether resin, butoxymethyl butyl glycidyl ether resin, bisphenol A-epichlorohydrin resin, or bisphenol F, or any combination thereof. In an embodiment, the epoxy resin includes bisphenol A diglycidyl ether resin.

In an embodiment, the loss control composition includes a surfactant to enhance stability of the foam. In an embodiment, the surfactant includes a cationic surfactant, an anionic surfactant, or a zwitterionic surfactant, or any combination thereof.

In an embodiment, the method includes adjusting a concentration of the carbamate in the loss control composition to adjust a thickening time of the epoxy. In an embodiment, the thickening time is between 0.5 hours and 24 hours.

In an embodiment, the method includes pumping drilling mud after the loss control composition to push the loss control composition into the loss circulation zone.

In an embodiment, the decomposition of the carbamate includes a reaction of the formula:

wherein R and R' are each independently selected from hydrogen, aliphatic groups, or aryl groups, or any combination thereof.

In an embodiment, the method includes selecting the epoxy resin based, at least in part, on well parameters. In an embodiment, the well parameters include well pressure, rock type, void type, or void size, or any combination thereof.

In an embodiment, the method includes selecting the amine curing agent based, at least in part, on well parameters. In an embodiment, the well parameters include well pressure, rock type, void type, or void size, or any combination thereof.

Other implementations are also within the scope of the following claims.

What is claimed is:

1. A method for mitigating loss circulation zones in a wellbore, comprising:
   synthesizing a carbamate from an amine-curing agent, wherein synthesizing the carbamate comprises reacting the amine-curing agent with carbon dioxide;
   mixing the carbamate with an epoxy resin to form a loss control composition;
   pumping the loss control composition into a wellbore with a loss circulation zone, wherein the loss control composition flows into the loss circulation zone; and
   allowing the carbamate of the loss control composition to decompose at wellbore temperatures, wherein:
   the carbamate releases $CO_2$ gas and the amine-curing agent;
   the $CO_2$ gas foams the epoxy resin, expanding the epoxy resin to fill voids in the loss circulation zone; and
   the amine-curing agent cures the foamed epoxy resin, forming a loss control material that seals the loss circulation zone.

2. The method of claim 1, comprising a reaction of the formula:

wherein R and R' are each independently selected from hydrogen, aliphatic groups, or aryl groups, or any combination thereof.

3. The method of claim 1, wherein the amine curing agent comprises an amine, an aromatic amine, an aliphatic amine, a cyclo-aliphatic amine, polyamines, amides, polyamides, a polyethyleneimine, piperidine, triethylamine, benzyldimethylamine, N,N-dimethylaminopyridine, 2-(N,N-dimethylaminomethyl)phenol, tris(dimethylaminomethyl)phenol, N-2-(aminoethyl)-3-aminopropyltrimethoxysilane, 3-glycidoxypropyltrimethoxysilane, n-beta-(aminoethyl)-gamma-aminopropyl trimethoxysilane, n-beta-(aminoethyl)-gamma-aminopropyl trimethoxysilane, piperazine, derivatives of piperazine, aminoethylpiperazine, pyrrole, imidazole, pyrazole, pyridine, pyrazine, pyrimidine, pyridazine, indolizine, isoindole, indole, indazole, purine, quinolizine, quinoline, isoquinoline, phthalazine, naphthyridine, quinoxaline, quinazoline, carbazole, carbazole, phenanthridine, acridine, phenanthroline, phenazine, imidazolidine, phenoxazine, cinnoline, pyrrolidine, pyrroline, imidazoline, piperidine, indoline, isoindoline, quinuclidine, morpholine, azocine, azepine, 1,3,5-triazine, thiazole, pteridine, dihydroquinoline, hexamethyleneimine, indazole, or 2-ethyl-4-methyl imidazole, or any combination thereof.

4. The method of claim 1, wherein the amine-curing agent comprises a polyethyleneimine.

5. The method of claim 1, wherein the epoxy resin comprises bisphenol A diglycidyl ether resin, butoxymethyl butyl glycidyl ether resin, bisphenol A-epichlorohydrin resin, or bisphenol F, or any combination thereof.

6. The method of claim 1, wherein the epoxy resin comprises bisphenol A diglycidyl ether resin.

7. The method of claim 1, wherein the loss control composition comprises a surfactant to enhance stability of the foam.

8. The method of claim 7, wherein the surfactant comprises a cationic surfactant, an anionic surfactant, or a zwitterionic surfactant, or any combination thereof.

9. The method of claim 1, comprising adjusting a concentration of the carbamate in the loss control composition to adjust a thickening time of the epoxy.

10. The method of claim 9, wherein the thickening time is between 0.5 hours and 24 hours.

11. The method of claim 1, comprising pumping drilling mud after the loss control composition to push the loss control composition into the loss circulation zone.

12. The method of claim 1, wherein the decomposition of the carbamate comprises a reaction of the formula:

wherein R and R' are each independently selected from hydrogen, aliphatic groups, or aryl groups, or any combination thereof.

13. The method of claim 1, comprising selecting the epoxy resin based, at least in part, on well parameters, wherein the well parameters comprise well pressure, well temperature, or any combination thereof.

14. The method of claim 1, comprising selecting the amine curing agent based, at least in part, on well parameters, wherein the well parameters comprise well pressure, well temperature, or any combination thereof.

\* \* \* \* \*

UNITED STATES PATENT AND TRADEMARK OFFICE
CERTIFICATE OF CORRECTION

| | |
|---|---|
| PATENT NO. | : 12,122,958 B2 |
| APPLICATION NO. | : 18/114759 |
| DATED | : October 22, 2024 |
| INVENTOR(S) | : Vikrant Bhavanishankar Wagle et al. |

It is certified that error appears in the above-identified patent and that said Letters Patent is hereby corrected as shown below:

In the Claims

In Column 8, Line 20-22, Claim 3, please replace "n-beta-(aminoethyl)-gamma-aminopropyl trimethoxysilane, n-beta-(aminoethyl)-gamma-aminopropyl trimethoxysilane," with -- n-beta-(aminoethyl)-gamma-aminopropyl trimethoxysilane, --

Signed and Sealed this
Twenty-eighth Day of January, 2025

Coke Morgan Stewart
*Acting Director of the United States Patent and Trademark Office*